(12) United States Patent
Hanazaki et al.

(10) Patent No.: US 6,224,510 B1
(45) Date of Patent: May 1, 2001

(54) DEVICE FOR CONTROLLING THE VEHICLE TO TRAVEL AT A CONSTANT SPEED

(75) Inventors: Ryoichi Hanazaki; Koji Nishimoto, both of Tokyo; Takayuki Yano, Hyogo, all of (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/438,155

(22) Filed: Nov. 10, 1999

(30) Foreign Application Priority Data

May 14, 1999 (JP) .................................................. 11-134540

(51) Int. Cl.$^7$ .................................................. B60K 41/04
(52) U.S. Cl. ............................ 477/108; 477/107; 477/110
(58) Field of Search .................................. 477/108, 107, 477/109, 110

(56) References Cited

U.S. PATENT DOCUMENTS 6,106,434 * 8/2000 Ibamoto et al. ....................... 477/120

FOREIGN PATENT DOCUMENTS

| 59-126142 | 7/1984 | (JP) | .................................. F16H/5/66 |
| 62-99221 | 5/1987 | (JP) | .............................. B60K/31/06 |
| 401279144 | * 11/1989 | (JP) | . |
| 11078599 | * 8/1997 | (JP) | . |

* cited by examiner

*Primary Examiner*—Sherry Estremsky
*Assistant Examiner*—Tisha D. Waddell
(74) *Attorney, Agent, or Firm*—Sughrue, Mion, Zinn, Macpeak & Seas, PLLC

(57) ABSTRACT

A device for controlling the vehicle to travel at a constant speed, which clearly distinguishes a downhill road over a flat road while the vehicle is traveling at a constant speed, and resets or resumes the overdrive position in order to stably maintain a vehicle speed at all times. The device comprises a downhill control means 10 for resetting the overdrive position of an automatic transmission 2 when the vehicle is traveling a downhill, wherein the downhill control means includes a downhill state detection means 13 for detecting the downhill state of the vehicle based on the throttle opening degree θ and the vehicle speed Vs, and an overdrive reset means 14 for resetting the overdrive position of the automatic transmission in response to the downhill state, wherein the reset state of the overdrive position is maintained while the downhill state is being detected, and the throttle valve opening degree is used as a reference for judging that the overdrive is resumed from the state of being shifted down.

3 Claims, 3 Drawing Sheets

FIG. 3

| $V_O$ [km/h] | $\theta_r$ [volts] |
|---|---|
| 60 | 1.0 |
| 70 | 1.2 |
| 80 | 1.5 |
| ⋮ | ⋮ |

DEVICE FOR CONTROLLING THE VEHICLE TO TRAVEL AT A CONSTANT SPEED

BACKGROUND OF THE INVENTION

1. Field of the Invention

The present invention relates to a device for controlling the vehicle to travel at a constant speed by using an automatic transmission having an overdrive position. More particularly, the invention relates a device for controlling the vehicle to travel at a constant speed, which clearly distinguishes a downhill road over a flat road while the vehicle is traveling at a constant speed, and resets or resumes the overdrive position in order to stably maintain a vehicle speed at all times.

2. Prior Art

There has heretofore been known a device for controlling the vehicle to travel at a constant speed by using an automatic transmission having an overdrive position as disclosed in, for example, Japanese Patent Laid-Open No. 59-126142.

The conventional device for controlling the vehicle to travel at a constant speed will be described below.

In the vehicles equipped with an automatic transmission, it is a tendency to mount a constant-speed traveling device for controlling the traveling speed to acquire a preset target vehicle speed.

When the device for controlling the vehicle to travel at a constant speed is used, the vehicle that is normally traveling is so controlled as to travel at the overdrive position at a constant speed by suppressing the engine rotational speed to a minimum limit in order to save fuel.

When the vehicle traveling at the overdrive position at a constant speed now arrives at steep downhill, the effect of the engine brake is so weak that the vehicle speed may become considerably greater than a target vehicle speed despite the throttle valve is fully closed.

According to the device for controlling a vehicle to travel at a constant speed disclosed in the above-mentioned publication, therefore, the vehicle speed is detected when the vehicle has arrived at a steep downhill while traveling in the overdrive range a constant speed, and the overdrive is automatically reset.

That is, it is judged that the vehicle is traveling the downhill at a moment when the speed of the vehicle that is traveling in the overdrive range at a constant speed becomes greater than the target vehicle speed by more than a predetermined value, whereby the overdrive is reset, the transmission is automatically shifted down to produce an increased effect of the engine brake thereby to suppress an increase in the vehicle speed.

According to the device for controlling a vehicle to travel at a constant speed constituted as described above, however, when the vehicle travels a long downhill, the shift-down and the shift-up take place consecutively, which may result in the occurrence of hunting.

That is, when the speed of the vehicle once decreases due to the shift-down while traveling the downhill, it is erroneously judged that the vehicle is now traveling on a flat road, and the automatic transmission is returned (shifted up) to the overdrive position. When the speed of the vehicle increases again, therefore, the transmission is shifted down again to repeat the above-mentioned operation.

According to the conventional device for controlling a vehicle to travel at a constant speed as described above, whether the vehicle is traveling a downhill or has resumed the traveling on a flat road is detected based on the vehicle speed. When the vehicle travels a long downhill, therefore, the shift-down and the shift-up are repeated giving rise to the occurrence of hunting.

SUMMARY OF THE INVENTION

The present invention was accomplished in order to solve the above-mentioned problem, and its object is to provide a device for controlling a vehicle to travel at a constant speed maintaining a stable vehicle speed at all times by using the throttle opening degree as a reference for judging the resumption of overdrive from the state of being shifted down, and by correctly distinguishing whether the vehicle is traveling the downhill or the flat road while being controlled to travel at a constant speed thereby to reset or resume the overdrive position.

A device for controlling a vehicle to travel at a constant speed according to the present invention comprises:

- an automatic transmission provided for an engine mounted on a vehicle;
- a throttle valve for adjusting the intake air amount taken in by said engine;
- a throttle opening degree detection means for detecting the opening degree of said throttle valve;
- a vehicle speed detection means for detecting the speed of said vehicle;
- a constant-speed travel control means for traveling the vehicle at a constant speed by controlling said throttle opening degree and the shift position of said automatic transmission, so that said vehicle speed comes into agreement with a target vehicle speed; and
- a downhill control means for resetting the overdrive position of said automatic transmission when the vehicle is traveling a downhill;

wherein said downhill control means includes:

- a downhill state detection means for detecting the downhill state of said vehicle based on said throttle opening degree and said vehicle speed; and
- an overdrive reset means for resetting the overdrive position of said automatic transmission in response to said downhill state;
- wherein the reset state of said overdrive position is maintained while said downhill state is being detected.

The invention is further concerned with a device for controlling a vehicle to travel at a constant speed, wherein the downhill control means returns the automatic transmission to the overdrive position at a moment when the throttle opening degree becomes larger than a predetermined opening degree while the overdrive position is being reset.

The invention is further concerned with a device for controlling a vehicle to travel at a constant speed, wherein the downhill control means variably sets the predetermined opening degree depending on the target vehicle speed, and increases a set point value of the predetermined opening degree with an increase in the target vehicle speed.

BRIEF DESCRIPTION OF THE DRAWINGS

FIG. 3 is a diagram illustrating map data of predetermined opening degrees according to an embodiment 2 of the present invention.

DESCRIPTION OF THE PREFERRED EMBODIMENTS

Embodiment 1

Figure 1:
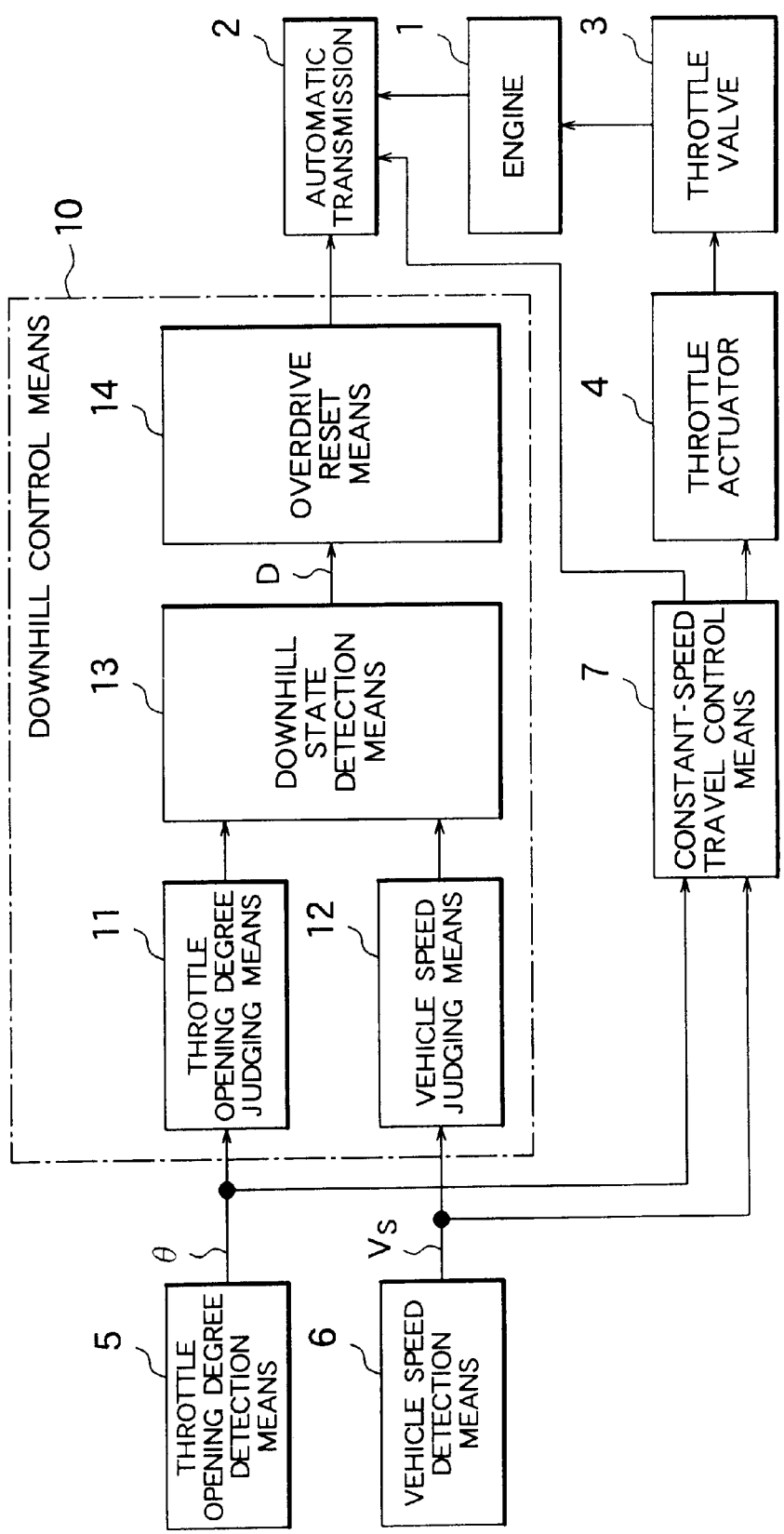
FIG. 1 is a block diagram schematically illustrating the constitution of an embodiment 1 of the present invention.

An embodiment 1 of the present invention will now be described with reference to the drawings. FIG. 1 is a block diagram schematically illustrating the constitution of an embodiment 1 of the present invention, wherein the output shaft of an engine 1 mounted on a vehicle is connected to an automatic transmission 2.

A throttle valve 3 for adjusting the intake air amount of the engine 1 is opened and closed by a throttle actuator 4.

A throttle opening degree detection means 5 detects the throttle opening degree θ of the throttle valve 3, and a vehicle speed detection means 6 detects the speed Vs of the vehicle.

A constant-speed travel control means 7 travels the vehicle at a constant speed by controlling the throttle opening degree θ and the shift position of the automatic transmission 2 so that the vehicle speed Vs comes into agreement with a target vehicle speed Vo.

A downhill control means 10 includes a throttle opening degree judging means 11 for judging the state of the throttle opening degree θ, a vehicle speed judging means 12 for judging the state of the vehicle speed Vs, a downhill state detection means 13 for detecting the downhill state of the vehicle based on the states of the throttle opening degree θ and the vehicle speed Vs, and an overdrive reset means 14 for resetting the overdrive position of the automatic transmission 2 in response to a downhill state signal D from the downhill state detection means 13.

While the downhill state detection means 13 is detecting the downhill state, the overdrive reset means 14 holds the state where the overdrive position of the automatic transmission 2 is reset in response to the downhill state signal D.

The downhill control means 10 turns off the downhill state signal D to clear the overdrive reset flag F at a moment when the throttle opening degree θ becomes larger than a predetermined opening degree θ r while the overdrive position is being reset, and returns the automatic transmission 2 to the overdrive position.

Next, the operation of the embodiment 1 of the present invention shown in FIG. 1 will be described with reference to a flow chart of FIG. 2 which illustrates the processing operation of the downhill control means 10 of FIG. 1.

Figure 2:
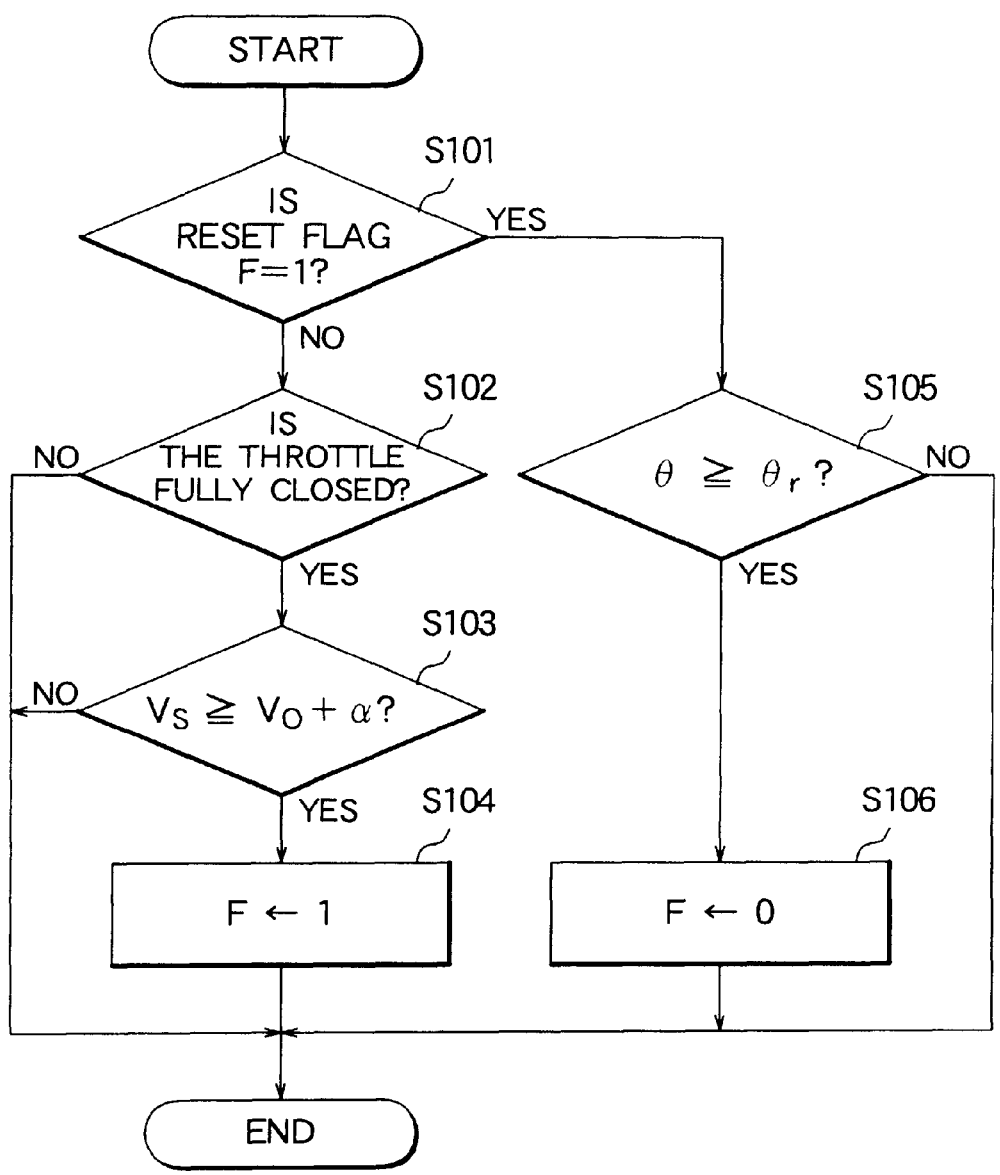
FIG. 2 is a flow chart illustrating the operation of the embodiment 1 of the present invention.

In FIG. 2, the downhill control means 10, first, makes a reference to the overdrive reset flag F and judges whether F=1 (overdrive is reset) or not (step S101).

When it is judged that F=0 (i.e., NO), it is regarded that the automatic transmission 2 is at the overdrive position and, hence, the downhill control means 10 makes a reference to the throttle opening degree θ to judge whether he throttle valve 3 is in a state of being fully closed or not (step S102).

When it is judged that the throttle valve opening θ is not in the fully closed state (i.e., NO), the processing routine of FIG. 2 ends.

When it is judged at the step S102 that the throttle opening degree θ is in the fully closed state (i.e., YES), then, the downhill control means 10 makes a reference to the vehicle speed Vs and judges whether the vehicle speed Vs is greater than the target vehicle speed Vo by more than a permissible value α (step S103).

When it is judged that Vs<Vo+α (i.e., NO), the processing routine of FIG. 2 ends.

When it is judged at a step S103 that Vs≧Vo+α (i.e., YES), it means that the vehicle speed Vs is increasing despite the throttle valve 3 is fully closed (downhill state). In order to forcibly shift down the automatic transmission 2, therefore, the overdrive reset flag F is set to "1" (step S104), and the processing routine of FIG. 2 ends.

When the vehicle runs on a steep downhill, therefore, the automatic transmission 2 is shifted down from the overdrive, whereby the action of engine brake increases and an increase in the vehicle speed Vs is suppressed.

On the other hand, when it is judged at the step S101 that F=1 (i.e., YES), the overdrive has been reset already (downhill state). Therefore, the downhill control means makes a reference to the throttle opening degree θ to judge whether the throttle opening degree θ is larger than the predetermined opening degree θ r or not (step S105).

When it is judged that θ<θ r (i.e., NO), the processing routine of FIG. 2 ends.

In this case, it is presumed that the predetermined opening degree θ r has been set to a value larger than an ordinary throttle opening degree of when the vehicle is traveling on a flat road in a state of being shifted down.

When it is judged at the step S105 that θ>θ r (i.e., YES), it is so regarded that the vehicle is now entering into a flat road from the downhill state resulting in an increase in the engine load. Therefore, the overdrive reset flag F is cleared to 0 (step S106), and the processing routine of FIG. 2 ends.

Then, the ordinary constant-speed travel control is resumed, and the automatic transmission is shifted up to the overdrive position.

Upon judging the traveling state of the vehicle by making a reference to the throttle opening degree θ in the state where the overdrive is being reset at the step S105, it is allowed to correctly discriminate the downhill road over the flat road while the vehicle is being controlled to travel at a constant speed, and the vehicle speed Vs is stably maintained at all times.

Further, the reset flag F is maintained set to "1" and the overdrive reset state is maintained until it is judged that the vehicle has entered into the flat road from the downhill road. While the vehicle is traveling downhill, therefore, the shift-up and the shift-down are not repetitively changed over (hunting does not occur).

Embodiment 2

In the above-mentioned embodiment 1, the predetermined opening degree θ r that serves as a reference for judging the flat road was set to a predetermined value, which, however, may be variably set depending upon a target vehicle speed Vo.

Figure 3:
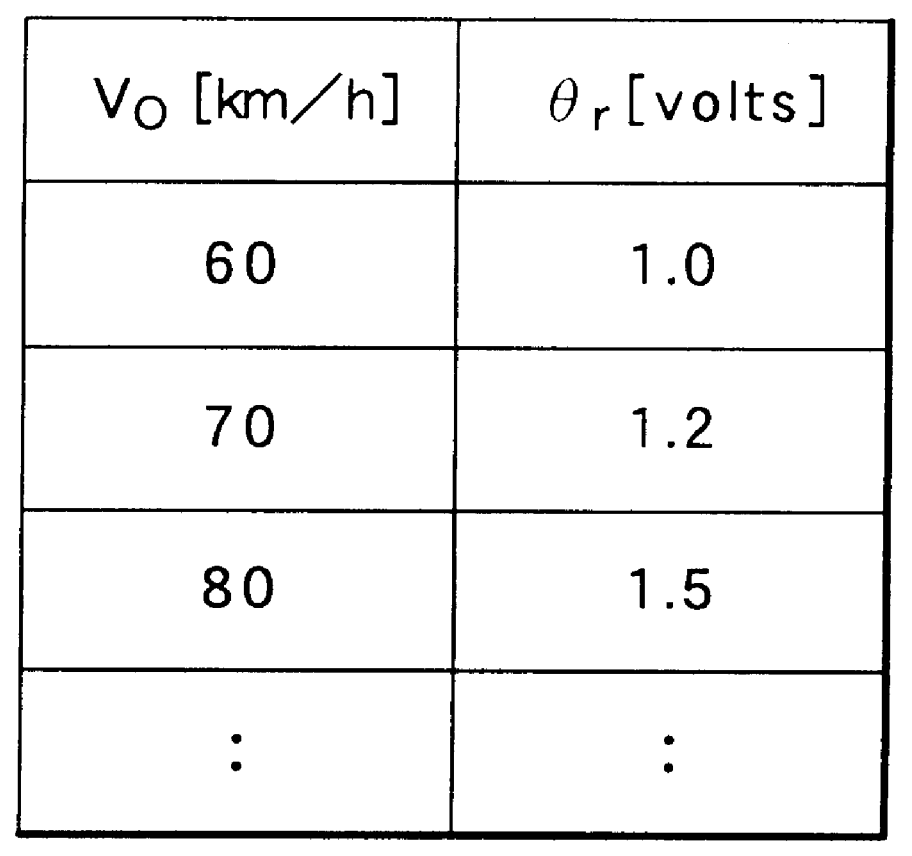

Described below with reference to FIG. 3 is an embodiment 2 of the present invention in which the predetermined opening degree θ r is variably set depending upon the target vehicle speed Vo. FIG. 3 is a diagram illustrating map data of predetermined opening degrees θ r.

In this case, the downhill control means 10 (see FIG. 1) variably sets the predetermined opening degree θ r by making reference to the map data of FIG. 3, so that the predetermined opening degree θ r that is set increases with an increase in the target vehicle speed Vo.

For example, the level for detecting the throttle opening degree θ is given by a voltage over a range of from 0 V to 5 V, whereas the predetermined opening degree θ r [volts] that serves as a reference for comparison with the throttle opening degree θ is set relative to the target vehicle speed Vo [km/h] as shown in FIG. 3.

In general, the lower the target vehicle speed Vo, the smaller the throttle opening degree θ for an increase in the engine load on a flat road. Upon setting the predetermined opening degree θ r as shown in FIG. 3, therefore, it is allowed to highly reliably judge the flat road and, hence, to more stably control the constant-speed traveling.

What is claimed is:

1. A device for controlling a vehicle to travel at a constant speed comprising:

an automatic transmission provided for an engine mounted on a vehicle;

a throttle valve for adjusting the intake air amount taken in by said engine;

a throttle opening degree detection means for detecting the opening degree of said throttle valve;

a vehicle speed detection means for detecting the speed of said vehicle;

a constant-speed travel control means for traveling the vehicle at a constant speed by controlling said throttle opening degree and the shift position of said automatic transmission, so that said vehicle speed comes into agreement with a target vehicle speed; and a downhill control means for resetting the overdrive position of said automatic transmission when the vehicle is traveling a downhill;

wherein said downhill control means includes:

a downhill state detection means for detecting the downhill state of said vehicle based on said throttle opening degree and said vehicle speed; and an overdrive reset means for resetting the overdrive position of said automatic transmission in response to said downhill state;

wherein the reset state of said overdrive position is maintained while said downhill state is being detected.

2. A device for controlling a vehicle to travel at a constant speed according to claim 1, wherein said downhill control means returns said automatic transmission to the overdrive position at a moment when said throttle opening degree becomes larger than a predetermined opening degree while said overdrive position is being reset.

3. A device for controlling a vehicle to travel at a constant speed according to claim 2, wherein said downhill control means variably sets said predetermined opening degree depending on said target vehicle speed, and increases a set point value of said predetermined opening degree with an increase in said target vehicle speed.

* * * * *